UNITED STATES PATENT OFFICE.

BALDWIN F. SCHIRMER, OF NEW YORK, N. Y.

PROCESS OF MAKING BEER.

1,297,013.  Specification of Letters Patent.  Patented Mar. 11, 1919.

No Drawing.  Application filed September 5, 1917.  Serial No. 189,747.

*To all whom it may concern:*

Be it known that I, BALDWIN F. SCHIRMER, a citizen of the United States, residing at New York city, in the county of New York and State of New York, have invented certain new and useful Improvements in Processes of Making Beer, of which the following is a specification.

This invention relates to the process of making beer or ale, the object of the invention being to provide an improved beer, in which a larger per cent. of the digestible body nourishing extract is retained in the beverage and a much less waste of extract and a greater saving in the amount of material heretofore used, obtained.

It is well known that in the art of brewing beer or ale in the United States, as well as in many other countries, the prepared wort for the purpose of being fermented with yeast through a period of six to ten days, in some few cases a shorter period of time, and some few others a longer period of time, is all made of the gravity of extract, which usually lies between the figures of ten to twelve per centum according to a commonly used scale known as "the Balling" method of measuring fermentable extract in the wort. After it is fermented as far as the wort will normally reduce through the action of yeast, the resultant beer or ale is stored in closed vessels for various periods. After having been stored for the desired length of time, this beer or ale is primed (generally termed "kraeusened") with partially fermented beer made of the same gravity according to "Balling" or any other scale applied, and this priming adds new life, carbonic acid gas and other features to beverage. After it has rested with the priming or "kraeusening" for some time, usually about three weeks, the beverage is generally filtered and racked into the package in which it is to be dispensed. In some cases, the primary wort is fairly well fermented, and stored for a while, and then carbonic gas is added artificially through some mechanical means, after which it is racked (in general being filtered previously) into packages in which it is to be dispensed.

My improvement consists in making, say fifty per cent. of the beverage, in the usual manner and adding to this fifty per cent. another fifty per cent. which has been made with about one-third of the material required for the first half, and allow this last half to ferment only two and one-half to three days with just half of the quantity of yeast required for the heavier wort. After this mixture of heavy and light gravity beer has been stored for the usual length of time, it is primed or "kraeusened" the usual way, or it is artificially charged with carbonic acid gas, and filtered and racked and dispensed in the usual manner.

By this method of brewing beer and ale or similar beverages, more of the nourishing parts of the extracts are retained in the ale or beer, which makes a better life sustaining liquid than as ordinarily made and therefore an improved beverage for human consumption, besides it enables the producer to make a great saving in the cost of the beer or ale or resultant beverage, but does not alter the flavor or quality of the ale, beer or beverage in any other noticeable manner.

I claim as my invention:

1. The process of making beer, which consists in first separately preparing a heavy gravity beer and then a lighter gravity beer, and then mixing the lighter gravity beer with the heavy gravity beer.

2. The process of making beer, which consists in making fifty per cent. of the beverage as a heavy gravity beer, and then preparing and adding to this fifty per cent. another fifty per cent. of a lighter gravity beer.

3. The process of making beer, which consists in making fifty per cent. of the beverage as a heavy gravity beer, and then preparing and adding to this fifty per cent. another fifty per cent. of a lighter gravity beer, said lighter gravity beer having about one-third of the material required for the heavy gravity beer.

4. The process of making beer, which consists in making fifty per cent. of the beverage as a heavy gravity material and fermenting it, then preparing a lighter gravity material and fermenting it for a materially less time than the heavy gravity material, said lighter gravity material having about one-third of the ingredients required for the heavy gravity material, and then adding to said fifty per cent. of heavy gravity material another fifty per cent. consisting of said lighter gravity material.

5. The process of making beer, which consists in making fifty per cent. of the beverage as a heavy gravity material and fermenting it, then preparing a lighter gravity material and fermenting it for a materially less time than the heavy gravity material and without about half the quantity of yeast required for the heavier gravity material, said lighter gravity material having about one-third of the ingredients required for the heavy gravity material, and then adding to said fifty per cent. of heavy gravity material another fifty per cent. consisting of said lighter gravity material.

6. The process of making beer and similar beverages, which consists in making about one-half the beverage as a heavy gravity material and fermenting it, then preparing the other half as a lighter gravity material and with about one-third the ingredients required for the heavy gravity material and fermenting it for a materially less time than the heavier gravity material and without about half the quantity of yeast required for the heavier gravity material, and then mixing the said one-half of the heavy gravity material with said lighter gravity material and storing the same.

7. The process of making beer, which consists in preparing a heavy gravity wort fermented with yeast for about four to twelve days, then adding thereto about the same quantity of a lighter gravity wort made of about one-third the material required for the heavier gravity wort, the lighter gravity wort being first fermented for about two and one-half to three days only with about half the quantity of yeast required for the heavier wort, then storing the mixture for a predetermined time and then priming it.

Signed at New York city, New York, this 30th day of August, 1917.

BALDWIN F. SCHIRMER.

Copies of this patent may be obtained for five cents each, by addressing the "Commissioner of Patents, Washington, D. C."